United States Patent [19]

Haapala

[11] 4,101,232
[45] Jul. 18, 1978

[54] TIER SUPPORT SYSTEM FOR FANCY CAKES

[76] Inventor: Ray Haapala, Rte. 3, Box 76, Dassel, Minn. 55325

[21] Appl. No.: 818,071

[22] Filed: Jul. 22, 1977

Related U.S. Application Data

[63] Division of Ser. No. 725,579, Sep. 22, 1976.

[51] Int. Cl.² ............................................. F16B 9/02
[52] U.S. Cl. ................................... 403/261; 403/349; 403/197
[58] Field of Search ............... 403/194, 348, 349, 239, 403/261, 259, 197, 201; 24/221 R, 221 K; 85/5 P

[56] References Cited
U.S. PATENT DOCUMENTS

| 1,065,498 | 6/1913 | Beck | 24/221 R |
|---|---|---|---|
| 1,284,038 | 11/1918 | Arkin | 85/5 P |
| 3,132,821 | 5/1964 | Herden | 403/349 X |
| 3,255,987 | 6/1966 | Gatch | 248/220.3 |
| 3,606,406 | 9/1971 | Walters | 403/240 |
| 3,811,157 | 5/1974 | Schenk | 403/349 X |
| 3,849,839 | 11/1974 | Zimber | 24/109 |
| 3,966,340 | 6/1976 | Morris | 403/353 |

Primary Examiner—Andrew V. Kundrat
Attorney, Agent, or Firm—Littlepage, Quaintance, Murphy, Richardson and Webner

[57] ABSTRACT

A leg for supporting a pallet is provided with means at one end for engaging in an aperture in the pallet and for clamping against opposite pallet surfaces surrounding the aperture.

1 Claim, 14 Drawing Figures

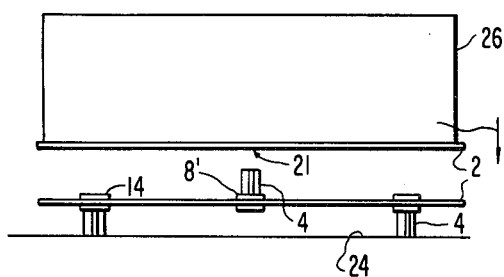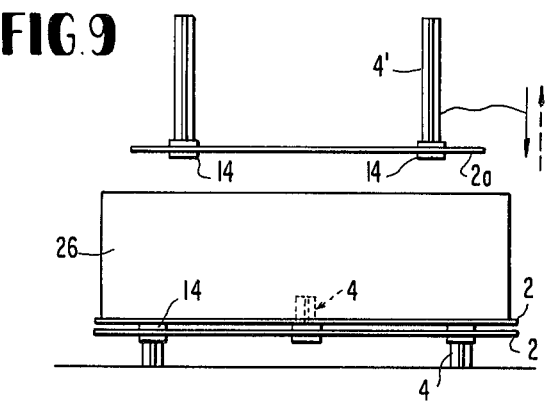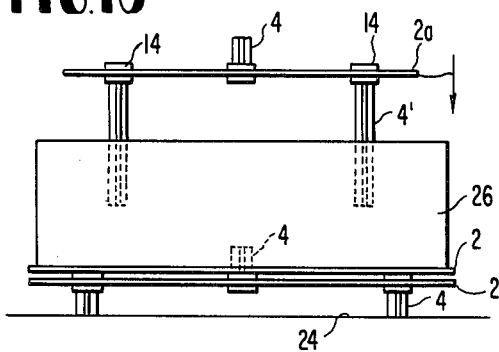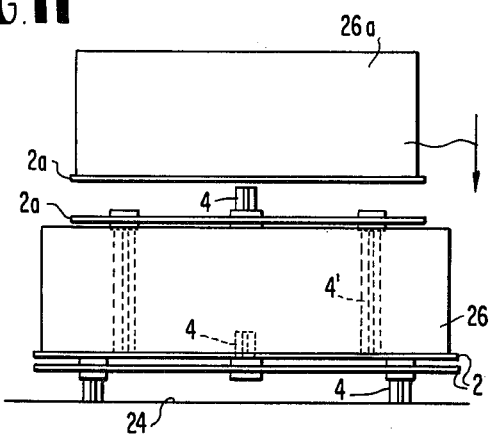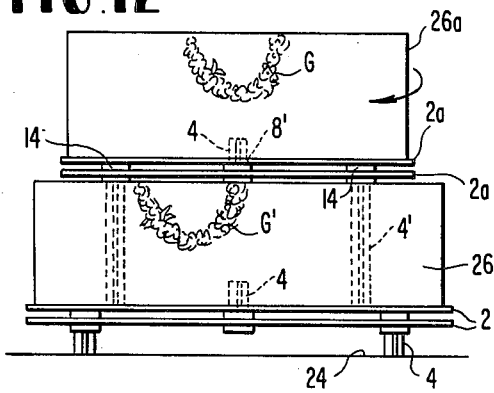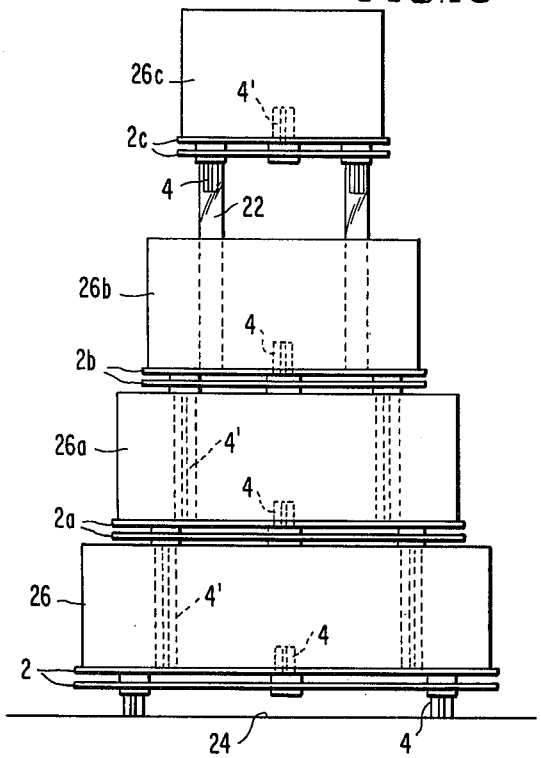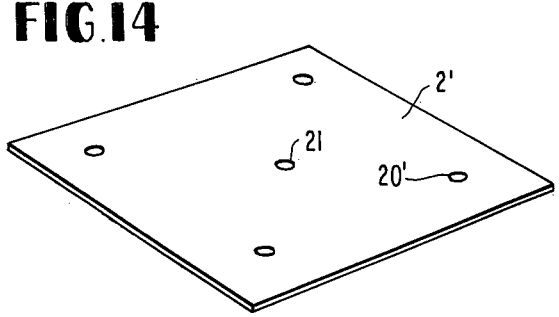

TIER SUPPORT SYSTEM FOR FANCY CAKES

RELATED APPLICATION

Haapala, Ser. No. 725,579 filed Sept. 22, 1976, for TIER SUPPORT SYSTEM FOR FANCY CAKES.

FIELD OF INVENTION

Joints And Connectors, Interfitted Members, Assembled by plural manipulation of members.

PRIOR ART

Gatch U.S. Pat. No. 3,255,987; Walters U.S. Pat. No. 3,606,406; Zimber U.S. Pat. No. 3,849,839; Morris U.S. Pat. No. 3,966,340.

OBJECTS

When tiers of fancy cakes, like wedding cakes, are superimposed, great care must be exercised to see that a "Leaning Tower of Pisa" effect does not result from uneven tiers or poor centering or uneven loading of tiers. Also, when one tier is set down upon another, care is needed to prevent smearing of or damage to icing or decoration on the supporting tier. Furthermore, since superimposed tiers frequently are decorated on their sides or tops with designs, such as garlands, it is essential that the designs on the several tiers be co-ordinated with one another. The objects of this invention are to provide a cake tier support system which makes it easy for a baker to meet the foregoing requirements.

More specifically, it is intended now to provide pallets for supporting cake tiers, removable spike-like legs, for supporting the pallets upon one another without imposing loads upon the cake tiers. Shorter spike-like legs may be disposed downwardly for supporting a base pallet on a supporting surface, or alternatively, one may be disposed upwardly for serving as a rotary bearing support onto which a superior pallet is rotatably supported. An additional objective is the provision of tubular extensions for the spike-like legs, which are usable for supporting a cake tier relatively far above an underlying tier.

This application is concerned with the means for engaging one end of the spike-like legs in apertures in the pallet, which means are usable for mounting any device in an apertured panel. More specifically, it is intended to provide a mounting means comprising two separable parts, one of which has a sleeve which may be easily inserted into the panel aperture, and the other of which has a projection which engages in the sleeve. In addition, it is intended to provide outwardly-extending collars on the members which engage against opposite sides of the panel adjacent the aperture, and cooperating leg and cam means on the members for clamping the panel between the collars when the members are relatively rotated.

These and other objects will be apparent from the following specification and drawings, in which:

FIG. 8 is an elevational view illustrating the installation of a pallet-supporting cake tier onto a base pallet;

FIG. 9 is an elevational view illustrating the use of a pallet with legs installed thereon for marking on the top of a cake tier the location at which the legs of a superior pallet are to be inserted;

FIG. 10 is an elevational view illustrating the pallet with its legs installed within a cake tier;

FIG. 11 is an elevational view illustrating the installation of a superior pallet onto the pallet which has been previously installed per FIG. 10;

FIG. 12 is an elevational view illustrating the rotatable adjustability of a pallet with a cake tier thereon;

FIG. 13 is an elevational view of a multi-tiered cake utilizing the various features of the system; and, FIG. 14 is a perspective view illustrating an alternate square form pallet.

Figure 1:
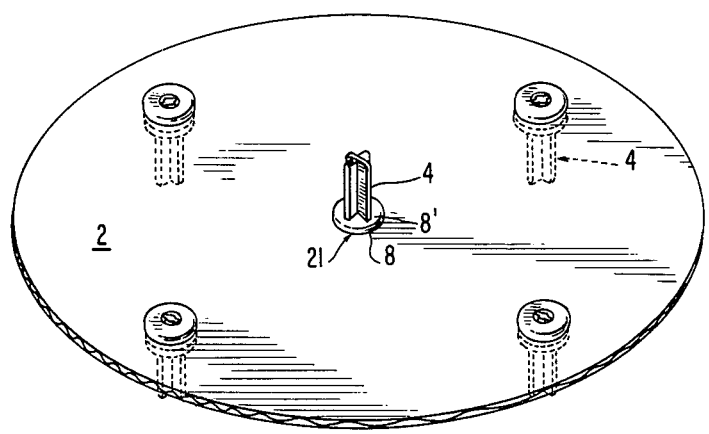
FIG. 1 is a round perspective view of a pallet with depending short legs for supporting the pallet above a supporting surface, and with an upstanding leg serving as a center spike.
Figure 2:
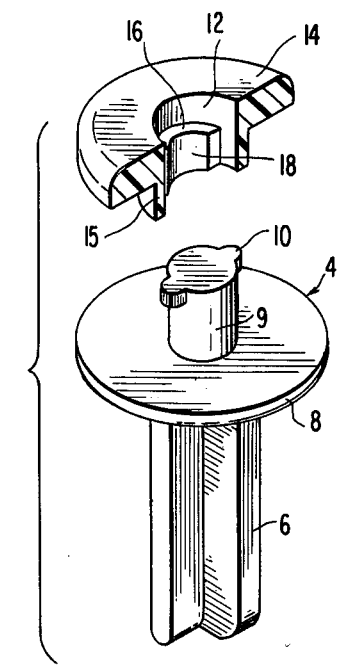
FIG. 2 is an exploded view showing a leg and, in cross section, a removable head therefore.
Figure 3:
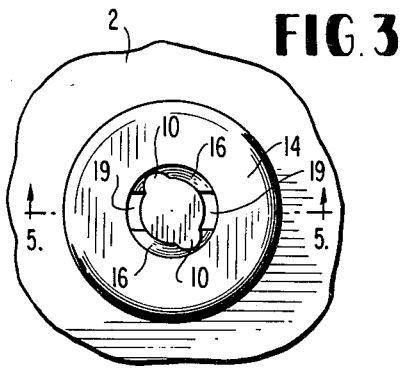
FIG. 3 is a plan view showing the bayonet connection for holding the head on the leg.
Figure 4:
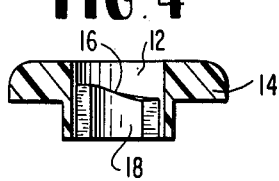
FIG. 4 is a cross-sectional view through the head.
Figure 5:
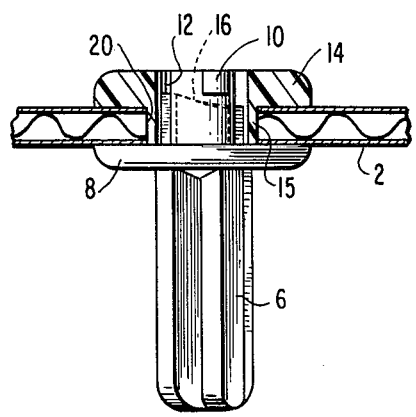
FIG. 5 is an elevational view partly in cross section along the line 5—5 of FIG. 4 showing a leg installed through a hole in a pallet.
Figure 6:
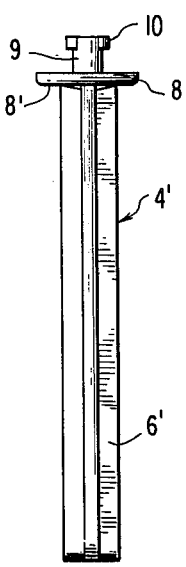
FIG. 6 is an elevational view of a long leg with the head removed.
Figure 7:
FIG. 7 is a perspective view of a tubular leg extension.

Referring now to the drawings, in which like reference numerals denote similar elements, the elements of the tier support system are shown in FIGS. 1–7 and 14. They consist of pallets of various sizes and shapes, such as round and square, legs of different lengths, long and short, and tubular leg extensions, all detailed hereinafter. In FIG. 1 there is shown a round pallet 2 having four depending and one upwardly-extending short legs 4 installed thereon. The shanks of the legs are composed of cruciform fins 6, so shaped as to facilitate insertion into and removal from an iced cake tier, the fins being surmounted a flange 8 above which projects a short cylindrical post 9 having opposed lugs 10 thereon. Within the center hole 12 of a head 14 and neck 15 are a pair of opposed cam ledges 16 which have inwardly facing semi-cylindrical surfaces 18 rotatably engaging around the cylindrical post 9. Between the semi-cylindrical surfaces 18 are gaps 19 which permit lugs 10 to pass through when neck 15 is set down onto flange 8 and then rotated so as to engage lugs 10 over cam surfaces 16, so as to effect a bayonet-lock of the head onto the top of the leg. As will be observed particularly in FIGS. 2, 3 and 5, after the post 9 of a leg is inserted through a hole in a pallet until the flange 8 engages against the surface of the pallet, a neck 15 of a head 14 is inserted through the hole in the opposite direction and rotated so as to effect the bayonet locking action, thereby clamping the pallet between the head 14 and flange 8 of the leg. If desired, the neck 15 of head 14 may first be inserted into the hole and the post is then inserted into the neck and locked by rotation of the leg. As shown in FIG. 1, four relatively short legs 4 are mounted in the angularly spaced holes 20 so as to extend downwardly from the pallet 2, and one relatively short post 4 is mounted through a center hole of the pallet as indicated at 21 so as to extend upwardly from the pallet surface, in which position it constitutes a center spike. The flat surface 8' of flange 8 presents a smooth bearing, the utility of which will be apparent hereinafter. The post 4' shown in FIG. 6 is similar in all respects to post 4 previously detailed except that its shank constituted by the cruciform fins 6' is considerably longer. FIG. 7 illustrates a tubular leg extension 22 which is engageable over a leg. Preferably the extension 22 is made of clear plastic for esthetic purposes.

FIGS. 8-13 illustrate the operation and capabilities of the system. In FIG. 8, a pallet 2 with the legs 4 installed as illustrated in FIG. 1 is supported on surface 24. For purposes of exposition, it will be assumed that the pallet 2 is ten inches in diameter. Another pallet 2 without legs installed, and with a cake tier 26 thereon is set down so that its center hole as indicated by the arrow lead line 21 engages over the upwardly projecting leg 4 in the center hole of the supporting pallet so that the center leg projects through the center hole of the superior palet and up into the center of tier 26. The heads 14 of the downwardly projecting legs 4 are bearings for the lower surface of the superior pallet 2, as is the upwardly-facing surface 8' of the flange 8 on the upwardly projecting leg 4 in the pallet center hole.

Let it be assumed that a second cake tier 26a of smaller diameter than tier 26 is to be superimposed. A smaller pallet 2a, for example, of eight inch diameter, and having long legs 4' installed in the angularly spaced holes may be used as a marking templet for locating the points at which the shankes of legs 4' will be inserted into the top of tier 26. For this purpose, the pallet 2a with the shanks of legs 4' extending upwardly is set down onto the top of tier 26 (FIG. 9) so that the heads 14 form indentations in the stop of the cake tier. Since the pallet 2a is round and since tier 26 is round, the pallet 2a can easily be centered by eye onto the top of tier 26 with great accuracy. Thereafter, with a short leg 4 installed into the center hole of pallet 2a so as to project oppositely from the shanks legs 4', the latter are then inserted into the top of tier 26 (FIG. 10) at the points which have been marked by the step illustrated in FIG. 9. Thereafter another eight inch pallet 2a, with a tier 26A thereon is set down onto the previously described pallet 2a (FIG. 11). As illustrated in FIG. 12, the tier 26a may be rotated so as to coordinate a design, such as the garland g thereon with a garland g' on tier 26. The bearings provided by the heads of the downwardly projecting legs, and the surface 8' permit the pallet 2a, with the tier 26a thereon, to rotate freely about the upwardly projecting leg 4, and the engagement of the shank of the upwardly projecting leg 4 into the underside of tier 26a prevents the latter from being dislodged or misplaced off center.

FIG. 13 illustrates a cake composed of four tiers 26, 26a, 26b and 26c of graduated size. The tier 26c is supported above the top of tier 26b by the tubular leg extensions 22 which have been engaged over the downwardly projecting shanks of legs 4, the tubular extensions being pushed downwardly through cake tier 26b until their lower ends rest upon pallet 2b. In FIG. 1 it will be apparent that although the cake is formed of four superimposed tiers, each superior tier is supported on a pallet below completely independently of any other cake tier. Thus, any tendency of the cake to sag over is avoided, the lower tiers are not compressed, and no tier has to be of precise uniformity in thickness in order to obtain a non-leaning cake.

In the foregoing it has been assumed that the cake tiers are round and that they are supported on round pallets. FIG. 14 illustrates a square pallet 2' having angularly spaced holes 20 and a center hole 21. Such a pallet would be used for square tiers. Other shaped pallets, for example, oblong, could be used for oblong tiers.

I claim:

1. A post having its entire length cross-sectioned so as to facilitate insertion into and removal from a cake with minimal distortion thereof with means for mounting the same in a panel aperture of predetermined size comprising:

a removable head member including a sleeve adapted to engage through the panel aperture and a collar on one end thereof larger than the panel aperture and having an underside spaced from the other end of the sleeve and extending outwardly from the sleeve, said sleeve having therein an opposed pair of cam ramps with circumferentially spaced ends defining therebetween an opposed pair of slots, a stud member on one end of said post, said stud member having on an outer end thereof an opposed pair of lugs adapted to engage through the opposed pair of slots between the cam ramps, and a second collar larger than the panel aperture and spaced along the length of said stud from said lugs, the length of the sleeve between the underside of the first collar being such that the end of the sleeve engages against the second collar and said outer end of said stud, said lugs, and the exposed end of the sleeve collar all lie in a common plane with said lugs seated on the cam ramps and the opposite end of said post also terminating in a plane with portions, adequate to provide support for said post.

* * * * *